Nov. 11, 1924.  1,515,442
O. A. RANKIN
SHELF SUPPORTING BRACKET
Filed April 29, 1924  2 Sheets-Sheet 1
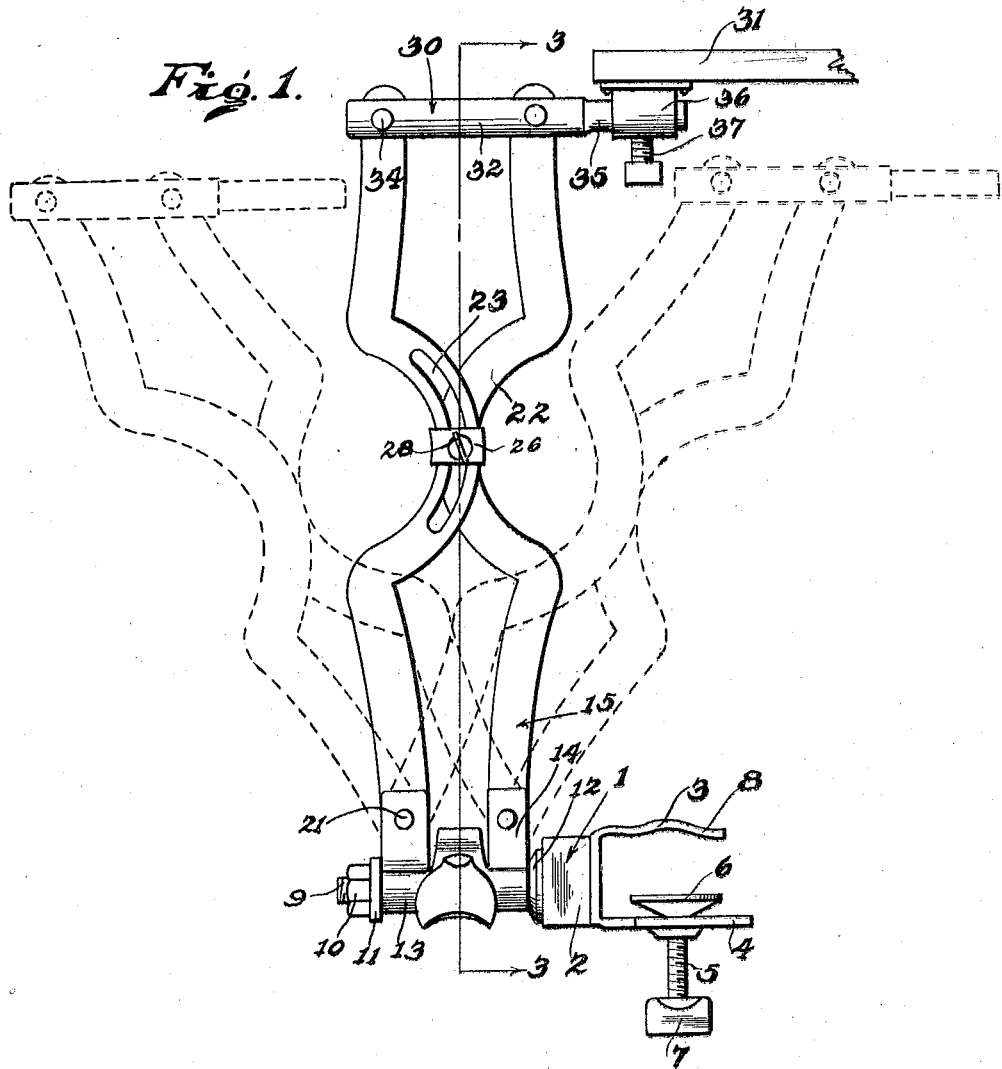
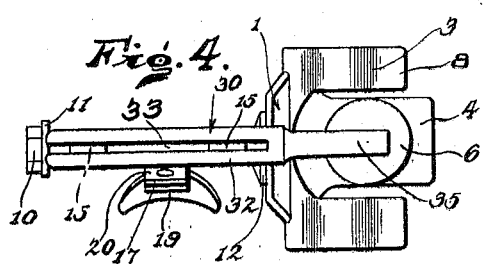
Inventor
Oren A. Rankin, Dec'd.
Mary Alice Rankin, Adm'rx.
By *Lacy & Lacy*, Attorneys Nov. 11, 1924.  1,515,442
O. A. RANKIN
SHELF SUPPORTING BRACKET
Filed April 29, 1924   2 Sheets-Sheet 2
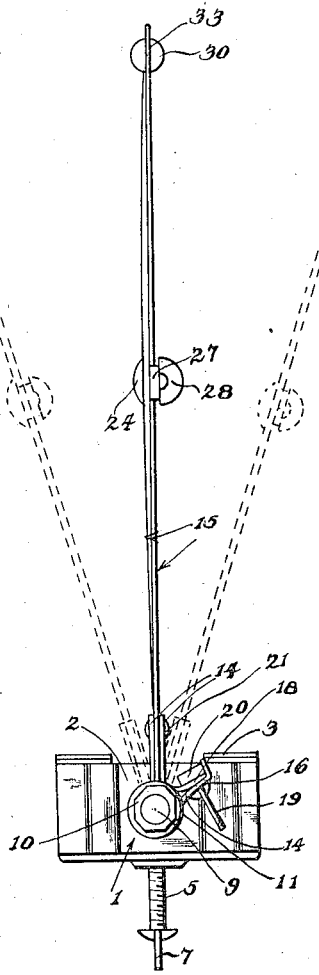
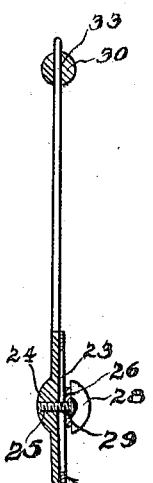
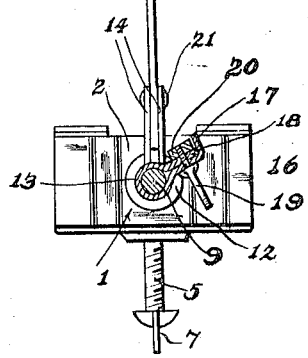
Inventor
Oren A. Rankin, Dec'd.
Mary Alice Rankin, Adm'rx.
By
Attorneys Patented Nov. 11, 1924.                                                          1,515,442

UNITED STATES PATENT OFFICE.

OREN A. RANKIN, DECEASED, LATE OF CYNTHIANA, KENTUCKY; BY MARY ALICE RANKIN, ADMINISTRATRIX, OF CYNTHIANA, KENTUCKY.

SHELF-SUPPORTING BRACKET.

Application filed April 29, 1924. Serial No. 709,825.

*To all whom it may concern:*

Be it known that OREN A. RANKIN, deceased, late a citizen of the United States, and former resident of Cynthiana, in the county of Harrison and State of Kentucky, invented certain new and useful Improvements in Shelf-Supporting Brackets, of which the following is a specification.

This invention relates to improvements in brackets for supporting shelves or table leaves and while the bracket may be put to many uses, it is designed more particularly for use by undertakers and is adapted to be detachably mounted upon the table upon which the body to be embalmed is laid out and adjusted so as to support in the most convenient position for use, the embalming instruments, lamp, and other articles disposed upon the shelf or table thereof.

One of the important objects of the invention is to so construct the bracket that it may be readily applied to a table or other support and adjusted to support the shelf which is mounted thereon at practically any desired elevation and in any desired position with relation to the surface of the table upon which the embalming operation is to be carried out.

In the accompanying drawings:

Figure 1 is a view in side elevation of the bracket embodying the present invention and the shelf supported thereby, the bracket being shown in full lines in true upright position and in dotted lines in other positions of adjustment;

Figure 2 is a rear elevation of the bracket, the view illustrating the bracket in upright position in full lines and adjusted to different angular positions in dotted lines.

Figure 3 is a vertical sectional view taken substantially on the line 3—3 of Figure 1 looking in the direction indicated by the arrows;

Figure 4 is a top plan view of the bracket.

The device comprises an attaching means which is indicated in general by the numeral 1 and which comprises a body 2 having spaced resilient and preferably corrugated upper bearing tongues 3 and a lower tongue 4 through which latter tongue is threaded a clamping bolt 5 having a bearing head 6 swiveled to its upper end and provided at its lower end with a finger piece 7 whereby the bolt may be adjusted. The attaching means is designed to be applied to the edge of a table upon which the device is to be supported with the tongues 3 engaging the upper side of the table and with the bearing head 6 engaging the under side of the table top, the bolt 5 being then tightened to securely clamp the supporting means in place. By convoluting or corrugating the bearing tongues 3, as indicated by the numeral 8, the tongues are given a desirable degree of resiliency and the bolt 5 may be tightly adjusted without likelihood of marring the finish of the table top. A stem 9 is permanently fixed at its forward end to the body 2 of the attaching means and extends in a rearward direction therefrom, and a nut 10 and washer 11 are fitted to the outer or rear end of the said stem, the washer being suitably spaced from a collar 12 which is formed upon the stem substantially at its juncture with the body 2. The numeral 13 indicates a split sleeve which is disposed to rotatably fit the stem 9 between the washer 11 and collar 12 as clearly shown in Figures 1 and 3 of the drawings. At each end, the open or split upper side of the sleeve is provided with a pair of upstanding ears 14, and disposed between the ears of each pair is the lower end of one of a pair of supporting or bracket arms indicated in general by the numeral 15 and which arms will be presently more specifically described. Between the ears 14, the sleeve is formed at one side with a substantially radially extending ear 16 having an upturned end 17, and the sleeve at its opposite side is provided with a similar ear 18 which engages flat against the ear 16. The ears 16 and 18 are provided with registering openings, and the threaded shank of a thumb screw 19 is fitted through these openings. The said shank of the thumb screw is threaded at its end into a nut 20 which is disposed against the outer side of the ear 18 and is held against rotation by engagement at one of its faces against the upturned end 17 of the ear 16, as clearly shown in Figures 2 and 3 of the drawings. It will now be evident that while the sleeve 13 is rotatably adjustable about the stem 9, it may be held in any of its positions of adjustment by tightening the thumb screw 19.

The bracket arms 15 heretofore referred to are connected to the ears 14 by pivots 21, and the said arms have their lower portions substantially vertical as also their upper portions, the intermediate portions of the two arms, however, being of arcuate form as indicated by the numeral 22 and the arms being so arranged that their said arcuate intermediate portions will be curved toward each other and overlapped as clearly shown in Figures 1, 2 and 3 of the drawings. The arcuate intermediate portion of one of the arms is formed with an arcuate slot 23, and the other arm is provided with a thickened portion or boss 24 having a threaded opening indicated by the numeral 25. A plate 26, which serves the purpose of a washer and also the purpose of a guide, is disposed against the arcuate intermediate portion of the arm which is provided with the slot 23, and the said plate extends transversely across this portion of the said arm and has its opposite edge portions turned at right angles as indicated by the numeral 27, these right angularly turned portions engaging the opposite edges of the said intermediate portion of the arm against which the plate is disposed. A thumb screw 28 is fitted through an opening 29 in the said plate 26 and is threaded into the opening 25. By reference to Figure 1 of the drawings, it will be observed that the arms 15 may be angularly moved in unison about their pivots 21 so as to assume various positions of angular adjustment both forwardly and rearwardly of a perpendicular passing through the mid portion of the structure when in the erect position shown in Figure 1 in full lines, and it will likewise be understood that the arms may be held in any desired position of angular adjustment by tightening the said thumb screw 28. It will also be observed by reference to Figure 2 that the arms may be adjusted in unison from the upright position shown in full lines in said figure, laterally in either direction to assume any desired position of angular adjustment and may be held in such position of adjustment by tightening the thumb screw 19.

The numeral 30 indicates a supporting member for the shelf, which shelf is indicated by the numeral 31, and the said supporting member 30 is preferably in the nature of a rod 32 which is formed with a longitudinal slot indicated by the numeral 33. The upper ends of the arms 15 are received within the slot 33, and pivot pins 34 are engaged through the walls of the slot and through the said upper ends of the arms. In this manner the supporting member 30 constitutes a means for connecting the arms for movement in unison while maintaining a substantially parallel relationship as shown in Figure 1. The forward end of the member 32 is preferably reduced in diameter as indicated by the numeral 35, and a sleeve or socket member 36 is secured to the under side of the shelf 31 and rotatably adjustably fits the said reduced end 35 of the member 32. A set screw 37 is threaded to the under side of the sleeve and may be tightened to bear against the said reduced end 35 of the member 32 so that when the arms are adjusted laterally to assume different angular positions as shown in Figure 2, the shelf 31 may be leveled by loosening the set screw 37, and after it has been brought to a level position, the set screw may be again tightened. It will likewise be seen that by loosening the set screw 37, the sleeve 36 may be slipped off from the end 35 of the member 32 and that in this manner the shelf may be disconnected from the bracket proper.

As previously stated, the device is designed primarily for use by undertakers in supporting their embalming instruments, and it will be evident by reference to Figures 1 and 2 of the drawings, that the bracket arms 15 may be adjusted so as to position the shelf 31 at practically any elevation above the surface of the table to which the bracket is applied, and that likewise the position of the shelf with relation to the table may be varied. In other words, the shelf may be positioned to lie entirely over the table, or it may be positioned to lie beyond one edge of the table.

Having thus described the invention, what is claimed as new is:

1. A supporting bracket comprising an attaching means, a pair of arms pivotally connected at their lower ends to the said means whereby to provide for swinging adjustment of the arms in unison, the said arms having their intermediate portions curved toward each other in overlapping relation, one of the arms having its said portion formed with an arcuate slot, a clamping means including an element engaging through the slot and through the intermediate portion of the other arm, and means pivotally connecting the upper ends of the arms and constituting an attaching means for the object to be supported.

2. A supporting bracket comprising an attaching means, a supporting member rotatably adjustably mounted thereon, a pair of arms pivotally connected at their lower ends to the said member for swinging movement in a direction transversely of the direction of rotation of the sleeve, whereby the arms may be swung in unison in a plurality of directions, means for holding the sleeve in its positions of rotative adjustment, means for holding the arms in different positions of adjustment about their pivots, and means pivotally connecting the upper ends of the arms and constituting an attaching means for the object to be supported.

3. A supporting bracket comprising an attaching clamp, a stem extending therefrom, a split sleeve rotatably fitting the said stem, means for clamping the sleeve to the stem in different positions of its rotative adjustment, a pair of arms pivotally connected at their lower ends at spaced points to the said sleeve, the intermediate portions of the arms being curved inwardly toward each other in overlapped relation and one of said intermediate portions being formed with an arcuate slot, a clamping means for the arms engaged through the intermediate portion of the other arm and through the said slot, and means pivotally connecting the upper ends of the arms and constituting an attaching means for the object to be supported.

In testimony whereof I affix my signature.

MARY ALICE RANKIN. [L. S.]
*Administratrix of the Estate of Oren A. Rankin, Deceased.*